United States Patent
Bugaj et al.

(10) Patent No.: US 11,931,823 B2
(45) Date of Patent: Mar. 19, 2024

(54) SYSTEMS AND METHODS FOR LASER-WELDING A WORKPIECE WITH A LASER BEAM THAT REACHES INACCESSIBLE AREAS OF THE WORKPIECE USING MULTIPLE REFLECTING PARTS

(71) Applicant: Dukane IAS, LLC, St. Charles, IL (US)

(72) Inventors: Grzegorz Zdzislaw Bugaj, Burbank, IL (US); Alexander Savitski, Arlington Heights, IL (US)

(73) Assignee: DUKANE IAS, LLC, St. Charles, IL (US)

( * ) Notice: Subject to any disclaimer, the term of this patent is extended or adjusted under 35 U.S.C. 154(b) by 297 days.

(21) Appl. No.: 17/215,520

(22) Filed: Mar. 29, 2021

(65) Prior Publication Data

US 2021/0213564 A1    Jul. 15, 2021

Related U.S. Application Data

(63) Continuation-in-part of application No. 17/182,055, filed on Feb. 22, 2021, which is a continuation-in-part
(Continued)

(51) Int. Cl.
*B23K 26/28* (2014.01)
*B23K 26/06* (2014.01)
(Continued)

(52) U.S. Cl.
CPC .......... *B23K 26/28* (2013.01); *B23K 26/0643* (2013.01); *B23K 26/0821* (2015.10)

(58) Field of Classification Search
None
See application file for complete search history.

(56) References Cited

U.S. PATENT DOCUMENTS 3,835,912 A    9/1974   Kristensen
3,943,324 A    3/1976   Haggerty
(Continued)

FOREIGN PATENT DOCUMENTS

CN    101681015 A    3/2010
CN    104400996 A    3/2015
(Continued)

OTHER PUBLICATIONS

Machine translation of DE-4122093-A1, Jun. 2023.*
(Continued)

*Primary Examiner* — Geoffrey S Evans
(74) *Attorney, Agent, or Firm* — Ice Miller LLP; Justin D. Swindells

(57) ABSTRACT

Device and method for laser welding around a circumference of a workpiece. A fixed, non-movable unitary optical reflector has a pair of optical reflecting surface portions on a first side surface and a second side surface, respectively, arranged at an obtuse angle relative to each other. A workpiece is fixed in an assembly having the reflector. During setup, the vertical distance is adjusted between the reflector and workpiece along an axis that is transverse to a longitudinal axis thereof without any adjustment of the reflecting surfaces. The first and second side surfaces define a curve that is transverse to the longitudinal axis. Once setup has been completed, a laser beam is directed so that it moves along the optical reflector to thereby produce a 360 degree circumferential weld around the workpiece. Another assembly is provided to change the laser beam direction multiple times to irradiate a circumference of a fixed workpiece from a fixed laser source.

16 Claims, 7 Drawing Sheets

Related U.S. Application Data of application No. 16/352,104, filed on Mar. 13, 2019, now Pat. No. 10,926,355.

(60) Provisional application No. 62/801,269, filed on Feb. 5, 2019.

(51) Int. Cl.
  *B23K 26/064* (2014.01)
  *B23K 26/082* (2014.01)

(56) References Cited

U.S. PATENT DOCUMENTS

| | | | |
|---|---|---|---|
| 3,989,778 | A | 11/1976 | Osborne |
| 4,266,667 | A | 5/1981 | Ishigaki |
| 4,350,867 | A | 9/1982 | Kinoshita |
| 4,429,211 | A | 1/1984 | Carstens |
| 4,572,941 | A | 2/1986 | Sciaky |
| 4,794,231 | A | 12/1988 | Banas |
| 5,011,282 | A | 4/1991 | Rearm |
| 5,049,720 | A | 9/1991 | Fang |
| 5,052,414 | A | 10/1991 | Aindow |
| 5,126,872 | A | 6/1992 | Birkle |
| 5,449,879 | A | 9/1995 | Lawson |
| 5,478,983 | A | 12/1995 | Rancourt |
| 5,508,490 | A | 4/1996 | Klose |
| 5,601,676 | A | 2/1997 | Zimmerman |
| 6,335,508 | B1 * | 1/2002 | Nam ............. B23K 37/0533 219/161 |
| 6,465,757 | B1 | 10/2002 | Chen |
| 6,476,345 | B1 | 11/2002 | Sator |
| 6,705,727 | B1 | 3/2004 | Bentley |
| 7,282,665 | B2 | 10/2007 | Chen |
| 7,368,381 | B2 | 5/2008 | Mikhailov |
| 7,564,006 | B2 | 7/2009 | Schwob |
| 7,810,696 | B2 * | 10/2010 | Nunnery ........... B23K 37/0531 228/44.5 |
| 8,404,994 | B2 | 3/2013 | Spennemann |
| 8,505,604 | B2 | 8/2013 | Stauffer |
| 9,393,738 | B2 | 7/2016 | Kugelmann |
| 2001/0028567 | A1 | 10/2001 | Akiyama |
| 2003/0102289 | A1 | 6/2003 | Nissels |
| 2003/0196750 | A1 | 10/2003 | Sakai |
| 2005/0103763 | A1 | 5/2005 | Momose |
| 2005/0121137 | A1 | 6/2005 | Kirkland |
| 2005/0167407 | A1 | 8/2005 | Chen |
| 2006/0134994 | A1 | 6/2006 | Yasuda |
| 2007/0045250 | A1 | 3/2007 | Moor |
| 2008/0023453 | A1 * | 1/2008 | Zhang ............. B23K 26/282 219/121.64 |
| 2008/0077173 | A1 | 3/2008 | Flanagan |
| 2008/0272521 | A1 | 11/2008 | Caldwell et al. |
| 2009/0002694 | A1 | 1/2009 | Paavola |
| 2009/0127238 | A1 | 5/2009 | Corrigan |
| 2011/0058230 | A1 | 3/2011 | Soeda |
| 2011/0200802 | A1 | 8/2011 | Li |
| 2012/0061878 | A1 | 3/2012 | Hofmann |
| 2012/0180328 | A1 * | 7/2012 | Schmid ............. B23K 26/34 33/263 |
| 2012/0218652 | A1 | 8/2012 | Stone |
| 2013/0320276 | A1 | 12/2013 | Farrell |
| 2014/0069921 | A1 | 3/2014 | Kristal |
| 2014/0313605 | A1 | 10/2014 | Bessler |
| 2015/0083302 | A1 | 3/2015 | Sawada |
| 2017/0182592 | A1 | 6/2017 | Sakitski et al. |
| 2017/0252859 | A1 | 9/2017 | Kumkar et al. |

FOREIGN PATENT DOCUMENTS

| | | | |
|---|---|---|---|
| CN | 106536121 | A | 3/2017 |
| CN | 107003531 | A | 8/2017 |
| DE | 4122093 | A1 * | 1/1993 ........... B23K 26/282 |
| DE | 4122093 | A1 | 1/1993 |
| DE | 10 2005 010 193 | A1 | 9/2006 |
| DE | 202007001346 | U1 | 4/2007 |
| DE | 102008042343 | A1 | 4/2010 |
| DE | 102009021448 | B3 | 7/2010 |
| DE | 102010025375 | A1 | 12/2011 |
| DE | 102011007792 | A1 | 10/2012 |
| DE | 102014108894 | | 12/2015 |
| DE | 102015119324 | A1 * | 5/2017 |
| DE | 102015119324 | A1 | 5/2017 |
| EP | 2813347 | | 12/2014 |
| JP | S5641091 | A | 4/1981 |
| JP | S59193779 | A | 11/1984 |
| JP | 4143092 | A | 5/1992 |
| JP | H05205839 | A | 8/1993 |
| JP | H08255708 | A | 10/1996 |
| JP | 11245064 | A | 9/1999 |
| JP | 2001-239381 | A | 9/2001 |
| JP | 2002067164 | | 3/2002 |
| JP | 2004063332 | | 2/2004 |
| JP | 2007230051 | | 9/2007 |
| KR | 100562984 | B1 | 3/2006 |
| WO | WO 2012/143181 | A2 | 10/2012 |
| WO | WO 2018/003133 | A1 | 1/2018 |

OTHER PUBLICATIONS

Machine translation of DE-102015119324-A1, Jun. 2023.*
Indian Intellectual Property Office, Examination Report in Application No. 202244008430, dated Sep. 1, 2022 (7 pages).
Indian Intellectual Property Office, Examination Report in Application No. 202147038464, dated Jan. 30, 2023 (6 pages).
"Plastic Racing Into The Future" Indianapolis ANTEC '96—vol. 1—Processing 1996,; The Society of Plastics Engineers; May 1996 (9 pages).
"Infrared Welding Of Thermoplastics, Colored Pigments And Carbon Black Levels On Transmission Of Infrared Radiation", by Robert A. Grimm and Hong Yeh—Edison Welding Institute; Mar. 31, 1998 (7 pages).
"Application With Infrared Welding Of Thermoplastics", by David A. Grewell, Branson Ultrasonics Corporation; Apr. 29, 1999 (5 pages).
"Three Approaches In Utilizing High Power Diode Laser To Join Thermoplastics", by Steven A. Kocheny—Lester Technologies, LLC., and Jerry Zybko—Lester Technologies, LLC; May 2002 (5 pages).
"Comparative Investigations On Quasi-Simultaneous Welding On The Basis Of The Materials Peek and PC", by H. Potente, G. Fiegler, F. Becker and J. Korte—University Of Paderborn, Paderborn, Germany; May 2002 (5 pages).
"Forward To Better Understanding Of Optical Characterization And Development Of Colored Polyamides For The Infra-Red/Laser Welding: Part I—Efficiency Of Polyamides For Infra-Red Welding", by Val Kagan, Robert Bray and Al Chambers—Honeywell International, Engineered Applications & Solutions, Morristown, NJ 07962-2332, USA; Apr. 2003 (7 pages).
"3D-Laser Transmission Welding", by H. Haberstroh, R. Luetzeler—Institut für Kunststoffverarbeitung, Aachen, Germany; May 2004 (6 pages).
Renner, T. et al., "Laser-adopted construction for plastic welding", retrieved on Jan. 15, 2007 from http://www.rofin.com/deutsch/anwendunen/laser-mikro-micro/data/E_PlastEurope02-04_Laser_adapted_Construction.pdf (p. 6, col. 1).
Olowinsky, Dr. Alexander, "Vortrag Technologie Seminar 2008 Verfahrenstechnik und Anforderungen an die Produktkonstruktion fur das Kunstsoffschweiben mit Laserstrahlung", ERW, Sep. 24, 2008, pp. 1-56, retrieved on Jul. 16, 2015 at http://www.wolf-produktionssysteme.de/de/veroeffentlicht/technologieseminar/technologieseminar2008/vortrag1.pdf (pp. 50-54).
Klein, R. et al.; "Schreiben und schweissen in einem Additive"; Kunststoffe, Carl Hanser Verlag, Munchen, Germany; No. 1, pp. 16-19; Jan. 1, 2011; XP009147617 (4 pages).
Brunnecker, F. et al.; "ClearJoining-Laserschweissen ohne Additive"; Carl Hanser Verlag, Munchen, Germany; vol. 103, No. 10, pp. 252-255; Jan. 1, 2013; XP001526380 (4 pages).

(56) References Cited

OTHER PUBLICATIONS

IPG Photonics; "Mid-IR Microwelder Pulsed/ CW Materials Processing Station"; retrieved from the Internet from: www.ipgphotonics.com/midir_microwelder.htm; May 2013 (2 pages).
Kunststoffe; "Klare Sicht mit neuem Licht"; pp. 26-29; Jun. 1, 2015; XP055199510 (4 pages).
International Search Report for Application No. PCT/US2015/026180, dated Sep. 21, 2015 (4 pages).
Written Opinion of International Searching Authority for Application No. PCT/US2015/026180, dated Sep. 21, 2015 (5 pages).
International Search Report for Application No. PCT/US2014/040791, dated Jul. 2, 2017 (1 page).
Written Opinion of International Searching Authority for Application No. PCT/US2014/040791, dated Jul. 13, 2017 (5 pages).
Office Action in Chinese Patent Application No. 201580020173.2, dated Oct. 18, 2017, with English machine translation.
International Search Report and Written Opinion of International Application No. PCT/US2017/051734, dated Dec. 6, 2017 (12 pages).
International Search Report for Application No. PCT/US2017/054684, dated Jan. 16, 2018 (5 pages).
Written Opinion of International Searching Authority for Application No. PCT/US2017/054684, dated Jan. 16, 2018 (7 pages).
International Search Report and Written Opinion in International Application No. PCT/US2020/016618, dated Apr. 30, 2020 (10 pages).

\* cited by examiner

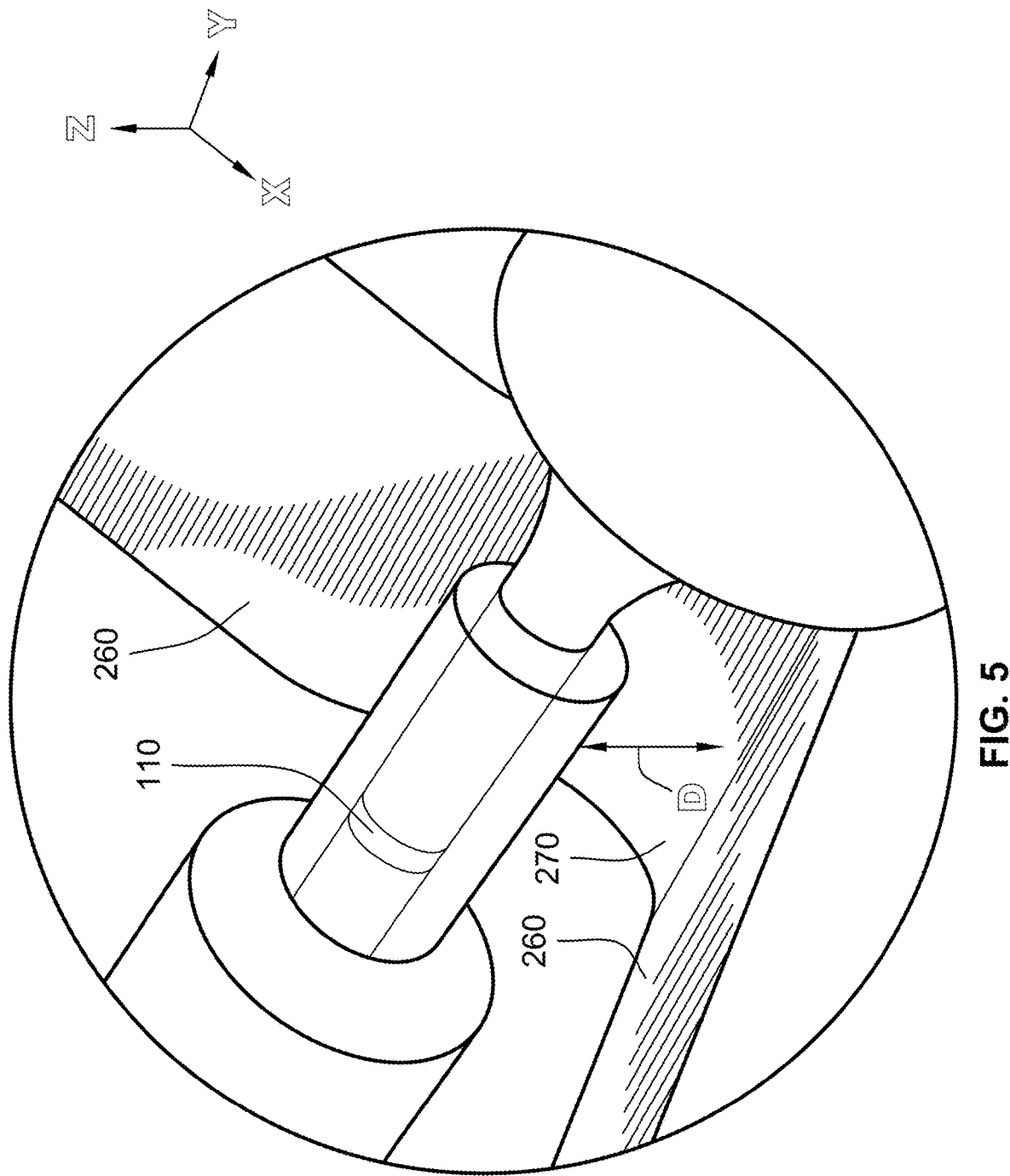

SYSTEMS AND METHODS FOR LASER-WELDING A WORKPIECE WITH A LASER BEAM THAT REACHES INACCESSIBLE AREAS OF THE WORKPIECE USING MULTIPLE REFLECTING PARTS

CROSS-REFERENCE TO RELATED APPLICATIONS

This application is a Continuation-in-Part of U.S. patent application Ser. No. 17/182,055, filed on Feb. 22, 2021, which is a Continuation-in-Part of U.S. patent application Ser. No. 16/352,104, filed on Mar. 13, 2019, granted as U.S. Pat. No. 10,926,355 B2 on Feb. 23, 2021, which claims priority to and the benefit of U.S. Provisional Patent Application No. 62/801,269, titled "Systems and Methods for Laser-Welding Tubular Components Using a Single, Fixed Optical Reflector with Multiple Reflecting Surfaces," filed Feb. 5, 2019, all of which are hereby incorporated by reference in their entireties.

FIELD OF THE INVENTION

Aspects of the present disclosure relate generally to laser-welding systems and, more particularly, to systems and methods for welding tubular components using a laser beam and a single, fixed optical reflector having multiple optically reflecting surfaces.

BACKGROUND

Most medication delivery devices incorporate plastic tubing that connects different parts of the device and those through which the medicine is delivered to the patient. A joint between various tubular components, such as tube-to-port, or tube-to-tube type is one of the most common sub-assembly and can be found in most medication delivery devices.

A laser-welding process is currently the most advanced assembly technique, and has a number of proven benefits for a high-volume manufacturing. However, utilizing a laser-welding process for joining tubular components between themselves and to other parts presents a technical challenge, as it requires a 360° circumferential weld around the mating surfaces. Because rotating the laser source around the assembly, or spinning the assembly (which may have a container or other components attached to it) under a stationary laser head are not always feasible for a manufacturing process, a number of methods have been proposed to address this challenge.

For example, a tubular workpiece can be disposed longitudinally at a center of a concave circular mirror surrounding the workpiece. Then, the laser beam is swiveled or circled around the mirror above the workpiece, directing the laser beam around the entire circumferential outer surface of the workpiece. This conventional technique is not suitable in a manufacturing environment because manipulation of the workpiece through the center of the circular mirror is very difficult and burdensome particularly in a high-production setting.

By way of another example, a complex set of optical reflectors are used to redirect the laser beam onto an opposite side of the workpiece. A combination of multiple concave and flat mirrors, such as conical, spherical, and plane mirrors, is used for deflecting the laser beam toward the opposite and lateral sides of the workpiece during welding. However, such intricate and convoluted optical systems are very expensive and difficult to repair during maintenance.

Another conventional approach is proposed in US Patent Application Publication No. 20170182592A1, which describes a pair of adjustable optical reflectors positioned under the tubular assembly, whose angles, as well as lateral and vertical positions can be adjusted, so the beam reflected from these reflectors could cover both sides of the bottom part of the assembly, while the upper part of the assembly is being exposed to the direct beam, which scans the assembly in lateral direction. The stated aim of this method is to deliver a "simpler, more space-saving technique." However, in order for the reflected beam to heat uniformly the whole bottom part of the assembly, and generate an even melting of the material, this method requires a time-consuming adjustment of each of the reflector pairs to find the correct angle and lateral and vertical position of the two reflectors in relation to the assembly.

If the angle between the two reflectors, or their lateral or vertical position are not correct, this error would result in uneven heating of different portions of the bottom part (workpiece). For example, a wider angle between the reflectors or a larger distance in the Z-axis (vertical relative to ground) between the two reflectors' base and the position of the assembly would lead to overheating of the very bottom of the workpiece part and under-heating of its sides. A larger lateral distance between the reflectors, a smaller angle, or a shorter Z axis separation, would result in excessive heating of the sides of the bottom part of the assembly, and under-heating of the center of the bottom (the lowest portion), which would cause an inadequate heating and potential leak path at that location. In order to heat both sides of the bottom part of the workpiece in the assembly uniformly, the angle between the Z axis (vertical) and the surface of both reflectors needs to be exactly the same, and while adjusting the angular position of one reflector is easy, measuring the angle between the reflectors in the fixture is very awkward, time-consuming, and challenging. As this adjustment needs to be iterated a number of times to find the correct angle corresponding to a specific position of the assembly, and to ensure that the position of both reflectors is identical. This need for a precise angular alignment of both reflectors relative to one another significantly contributes to the difficulty of the setup.

In other words, the approach proposed in US Patent Application Publication No. 20170182592A1 provides too many opportunities for setup error or a prolonged setup time because of the numerous adjustment combinations that have to be made to multiple operating components of the assembly for each workpiece part.

Another need exists for an arrangement in which the laser can reach areas of a workpiece that are not in the direct path of the laser. For example, the area of a workpiece directly behind a laser cannot be accessed by the energy unless the workpiece is turned or the laser is moved, which requires careful calibration and movement coordination and a bulky setup that would be difficult to apply to multiple workpiece types and form factors.

Therefore, what is needed are systems and methods for more accurately laser-welding tubular components that yields more consistent and higher quality weld results without requiring extensive, error-prone, or time-consuming pre-adjustment or calibration of the assembly prior to welding in a high-production manufacturing setting.

SUMMARY OF THE INVENTION

Aspects of the present invention reflect improvements to the disclosure set forth in US Patent Application Publication No. 20170182592A1. A key difference is that instead of using a pair of optical reflectors, the present disclosure proposes to use a single, unitary, fixed optical reflector having multiple optically reflecting side surfaces (configured to reflect a laser beam) that are angled at an obtuse angle (greater than 90 degrees and less than 180 degrees) relative to each other. Another key difference is that the only pre-welding setup required for the welding assembly is a Z-axis adjustment (vertical direction) of the workpiece relative to the optical reflector before initiating the laser weld. No adjustment of the respective lateral positions or angles of the reflecting surfaces relative to one another is required relative to the workpiece. Indeed, because the optical reflector of the present disclosure is a fixed, unitary piece, no such adjustment is even possible. Thus, the optical reflector remains fixed at all times, both pre-weld during setup of the equipment, and during welding itself in which laser energy is imparted to the workpiece. Furthermore, the laser source does not need to be rotated around the workpiece during welding, but rather remains at a stationary distance relative to the workpiece both pre-weld during setup and during the weld. These aspects produce a consistently high quality 360-degree circumferential weld with high repeatability and very low variability, and very minimal setup time and effort (only adjustment of the vertical distance between the workpiece and the bottom or center of the optical reflector), in a high-production setting where setup time needs to be minimized, but the weld must be consistent and of high quality from part to part without requiring micro-adjustments to the setup while the same parts are being welded during a manufacturing process. The present disclosure promotes a "set it and forget it" configuration of a laser-welding setup for circumferential welding of tubular parts (workpieces), with only one adjustment needed during setup before welding is initiated for the same parts without requiring any further adjustments for the same part in a high-production setting. Not only is weld quality overall improved and remarkably consistent from part to part, but throughput is significantly increased due to the quick setup time (vertical adjustment of one part of the assembly) and elimination of any adjustments needed once the setup has been completed.

A laser welding system for welding around all or most of a circumference of a workpiece is provided. The system includes a laser beam source configured to direct a laser beam; and an assembly including a first angled reflector and an optical reflector assembly, the first angled reflector being arranged at a fixed angle to change a direction of the laser beam so that the laser beam irradiates a front area of the workpiece, the optical reflector assembly having at least two angled mirrors positioned to direct the laser beam passing around the workpiece to reach areas of the workpiece that are not directly in the path of the laser beam. The first angled reflector can be angled relative to the laser beam at 45 degrees such that the laser beam changes direction orthogonally relative to its direction emanating from the laser beam source. The at least two angled mirrors can include a first mirror and a second mirror. The first mirror and the second mirror can be arranged on a curved surface of the optical reflector assembly such that they change a direction of the laser beam by 45 degrees, thereby allowing the laser beam to reach the areas of the workpiece that are not directly in the path of the laser beam. The laser beam source can be fixed, and the workpiece can be fixed relative to the assembly as the laser beam is presented to the workpiece. The workpiece can have a generally cylindrical cross section at an area where a weld is to be created. The laser beam can reach an entire circumference of the workpiece in response to its direction being changed by the first angled reflector and the optical reflector assembly. The optical reflector assembly can include a third mirror positioned to change a direction of at least a portion of the laser beam toward an area of the workpiece that is not directly in the path of the laser beam after being reflected by the first angled reflector.

BRIEF DESCRIPTION OF THE DRAWINGS

The invention will be better understood from the following description of preferred embodiments together with reference to the accompanying drawings, in which:

FIG. 5 is a perspective view of an adjustable vertical distance between the workpiece and the bottom or lowest point of the top surface of the optical reflector;

DETAILED DESCRIPTION OF THE ILLUSTRATED EMBODIMENTS

Figure 1:
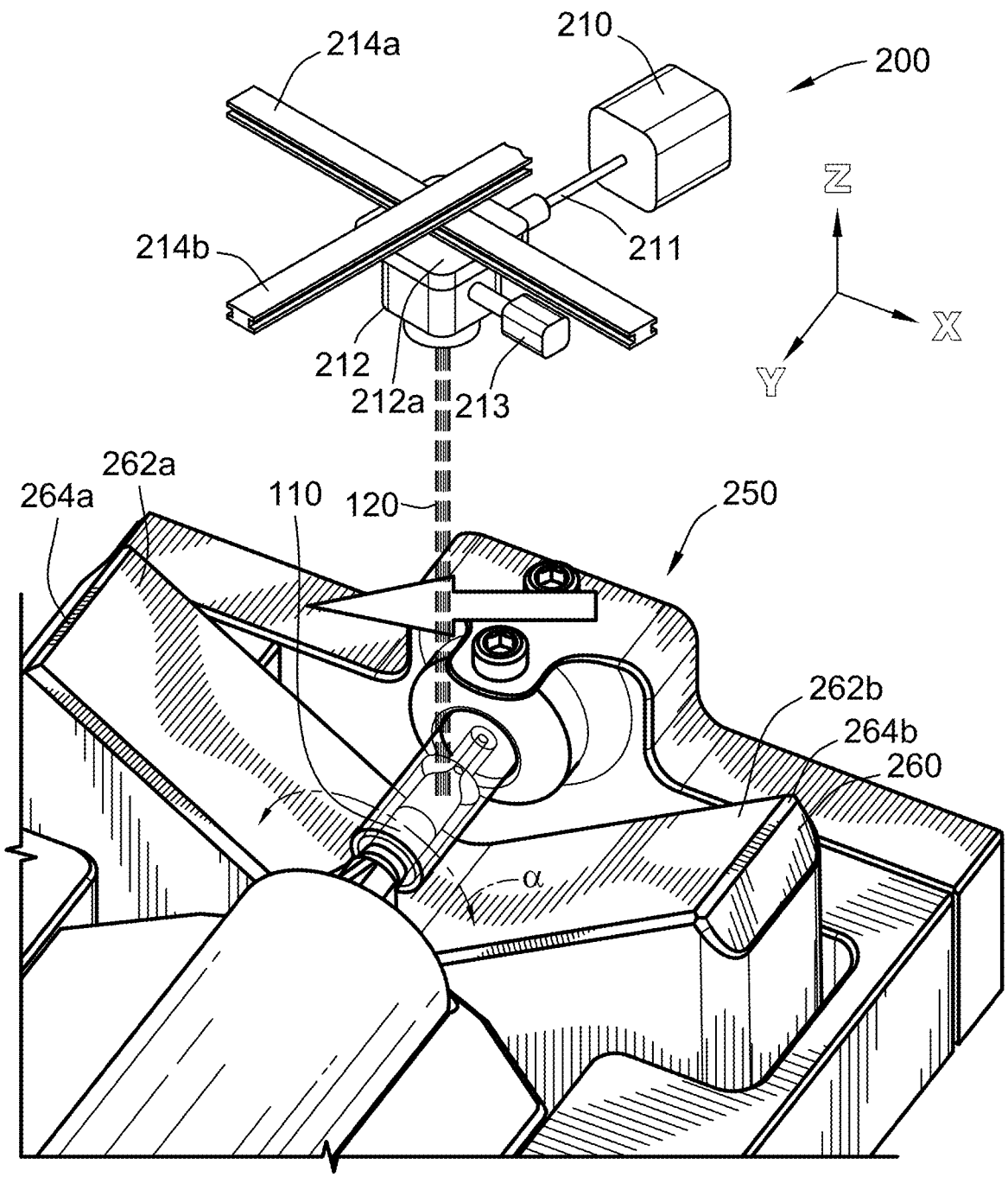
FIG. 1 is an example laser assembly and workpiece assembly with a fixed U-shaped optical reflector with stationary reflecting surfaces fixed at an obtuse angle.

A laser assembly 200 shown in FIG. 1 includes a conventional laser source 210, which generates a laser beam 120 of radiation. A mount 212a is coupled to orthogonal gantries 214a and 214b. One or more scanner mirrors within a scan head 212 are controlled by a processor-controlled drive unit 213 to direct a laser beam 120 downwardly onto an assembly 250 that includes a thermoplastic workpiece 110 having a tubular part to be joined by welding. The drive unit 213 is controlled to adjust the positions of the scanner mirrors to move the laser beam 120 in a manner required to illuminate a prescribed weld zone on the top surface of the workpiece 110 fixed within the assembly 110.

Based on the experimentation it has been established that using a single, unitary V- or U-shaped reflector 260 having two flat side surfaces 262a, 262b fixed at approximately 110-135 degrees (e.g., plus or minus 15%) to each other and a continuous reflecting surface from end-to-end 264a, 264b, allows the setup for a tubular workpiece 110 placed equidistant to the sides 262a, 262b of the optical reflector 260 to be greatly simplified compared to conventional approaches, and limits the required setup effort to only the vertical adjustment (Z-axis) of the part position. Moving the workpiece 110 and the optical reflector 260 closer together (decreasing distance D labeled in FIG. 5) allows to direct more laser energy from the laser source 210 to the very bottom of the workpiece part 110, whereas moving the workpiece 110 and the optical reflector 260 farther apart (along the Z-axis or increasing distance D shown in FIG. 5) increases the illumination of the sides of the lower portion of the workpiece 110. Once the Z value which provides an even illumination of the bottom portion of the part is found, the workpiece 110 and the optical reflector 260 are locked to that Z-value distance D (FIG. 5), and the setup is complete. Scanning the workpiece 110 with the laser beam 120 in a lateral direction (no rotation, see X and/or Y axis labeled in FIG. 1) by the weld head 212 positioned above the assembly 250, will illuminate the upper portion of the workpiece 110 by direct exposure to the laser beam 120, and the bottom portion of the workpiece 110 by the laser beam 120 reflected by the V- or U-shaped reflector 260, thus allowing a 360° circumferential weld around the tubular workpiece 110.

Figure 2:
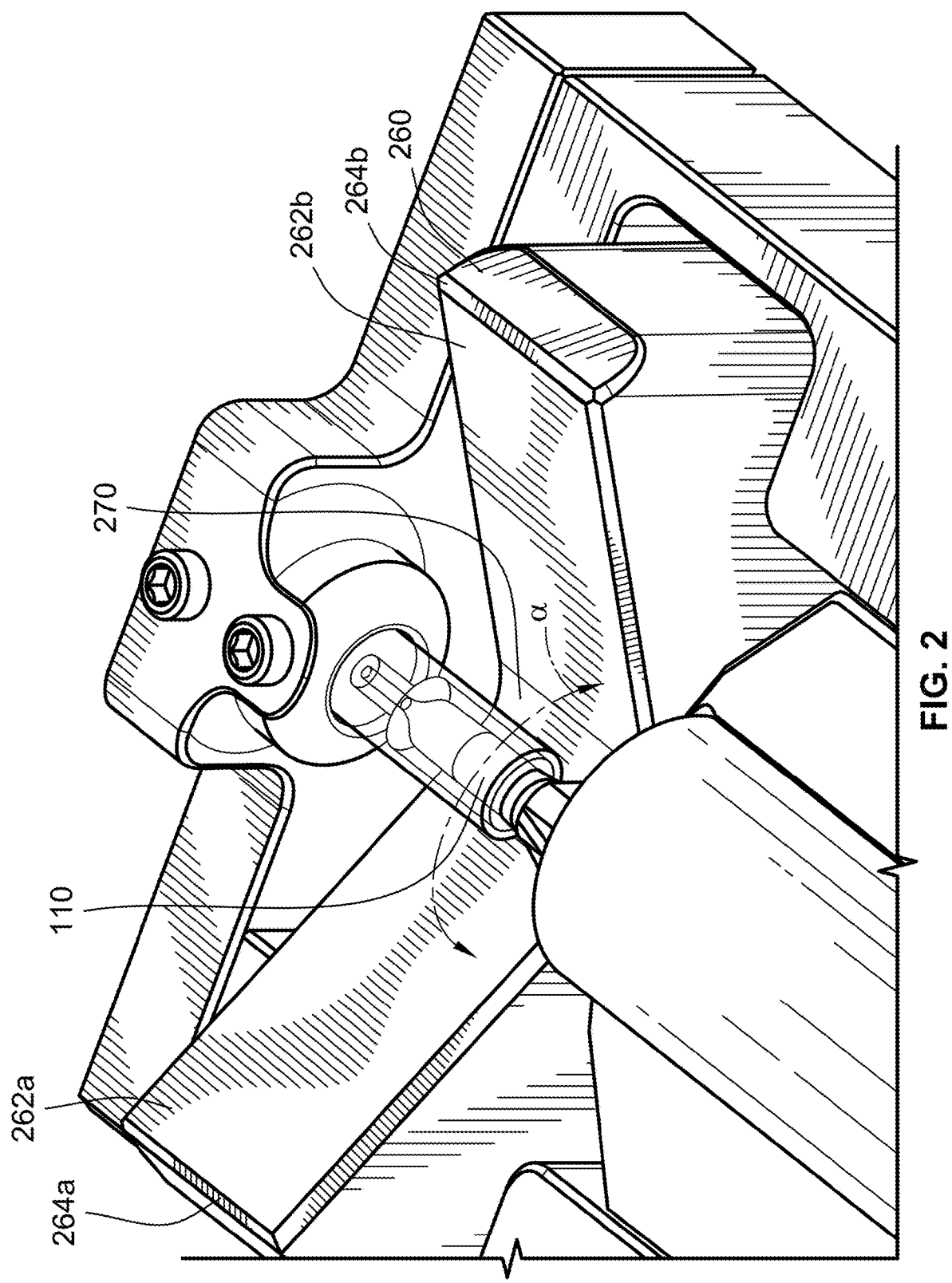
FIG. 2 is a perspective view of the workpiece assembly shown in FIG. 1.

The optical reflecting surface(s) 262a, 262b of the optical reflector 260 can be a gold-plated mirror, which is configured to reflect laser energy 120 received. The angle of the surfaces 262a, 262b direct the laser energy 120 into surfaces of the workpiece 110 that are not directly accessible to the laser beam 120, which is fixed above the workpiece 110. Those of ordinary skill in the welding art will appreciate that the entire surface 262a, 262b does not have to be coated with an optically reflecting material. As a practical matter, it is convenient to plate the entire surface of the optical reflector 260 with gold or other optically reflecting material, but of course only the surface portions of the optical reflector 260 where the laser beam 120 will be directed need to have an optically reflecting material. The other portions do not have to optically reflecting, such as the bottom or lowest portion 270 (best seen in FIGS. 2 and 5) directly below the workpiece 110 where no laser energy will be received. The portion 270 (FIG. 2) directly underneath the workpiece 110 receive the reflected laser energy that bounce off of the optically reflecting surfaces 262a, 262b of the optical reflector 260. All this is to say that those skilled in the art will appreciate that only those surface portions where laser energy 120 will be directed need to be optically reflecting on the optical reflector 260. The key point here is that the optical reflector 260 is non-moving and stationary at all times, including during setup of the assembly when the vertical distance, D, along the Z-axis between the underside of the workpiece 110 and the bottom or lowest point 270 of the optical reflector 260 directly below the underside of the workpiece 110 is being optimized.

The first 262a and second 262b side surfaces of the fixed optical reflector 260 are arranged at a fixed obtuse angle α relative to each other. By fixed it is meant that the angle α is unchanged even during setup before the laser weld is initiated. The assembly 250 has a height adjustment mechanism (not shown) that is configured to adjust a vertical distance D between the lowest point 270 of the optical reflector 260 and the underside of the workpiece 110 along a Z-axis that is transverse to a longitudinal axis (e.g., Y-axis) of the workpiece 110. Preferably, the workpiece 110 is the adjustable part of the assembly 250, such that the workpiece 110 is moved up or down relative to the optical reflector 260 to change the vertical distance D (shown in FIG. 5). Alternately, the workpiece 110 can be fixed, and the optical reflector 260 is adjusted up or down to change the vertical distance D; however, at all times the angle α between the reflecting surfaces 262a, 262b is constant and fixed. In yet another alternative, both the workpiece 110 and the optical reflector 260 can be adjusted along the Z-axis to change the distance D, for example, in an assembly 250 that has been retrofitted or modified to be configured according to the present disclosure.

The first and second side surfaces 262a, 262b define a curve that is transverse to the longitudinal axis (e.g., Y-axis), and this curve forms the V- or U-shape of the optical reflector 260. Note that this portion does not have to be strictly curved, because no laser energy will be directed to this portion, so its shape plays no role and therefore has no impact on optical reflection. Rather, it can be relatively flat or notched, depending on the design parameters and the angle of the reflecting surfaces 262a, 262b. It also does not have to be coated with an optically reflecting material, but for ease of manufacturability, coating the entire surface of the optical reflector 260 is desirable from that standpoint.

While in one aspect the reflecting surface on the optical reflector 260 can be continuous, those skilled in the art will appreciate that the portion of the optical reflector 260 that sits directly underneath or below (relative to the incoming laser beam 120) the workpiece 110 does not directly receive the laser beam 120, and thus it is not necessary to render that part of the surface optically reflecting. While it is easier to manufacture a continuous surface, the present disclosure is not limited to a continuous surface. The flat side surfaces 262a, 262b of the optical reflector 260 can receive a reflective optical coating, whereas the portion 270 of the optical reflector 260 that sits directly beneath the workpiece 110 can lack a reflective optical coating. Moreover, while a single, unitary optical reflector 260 is also described, in other aspects, the optical reflector 260 can be composed of multiple parts, but all such parts being fixed and stationary to one another so that their angle α cannot be adjusted during setup of the assembly 250. The point is that there are at least two reflecting surfaces 262a, 262b that are fixed and stationary during the setup of the assembly 250, such that only a vertical adjustment of the distance D between the workpiece 110 and those reflecting surfaces 262a, 262b is necessary during setup. This differs from conventional approaches that allowed too much freedom of adjustment of the lateral distance and angular displacement of the reflectors and distance between workpiece and the reflectors, but this freedom leads to longer setup times and more complex setup parameters, iterative adjustments of the setup parameters, and other problems indicated above.

Figure 3:
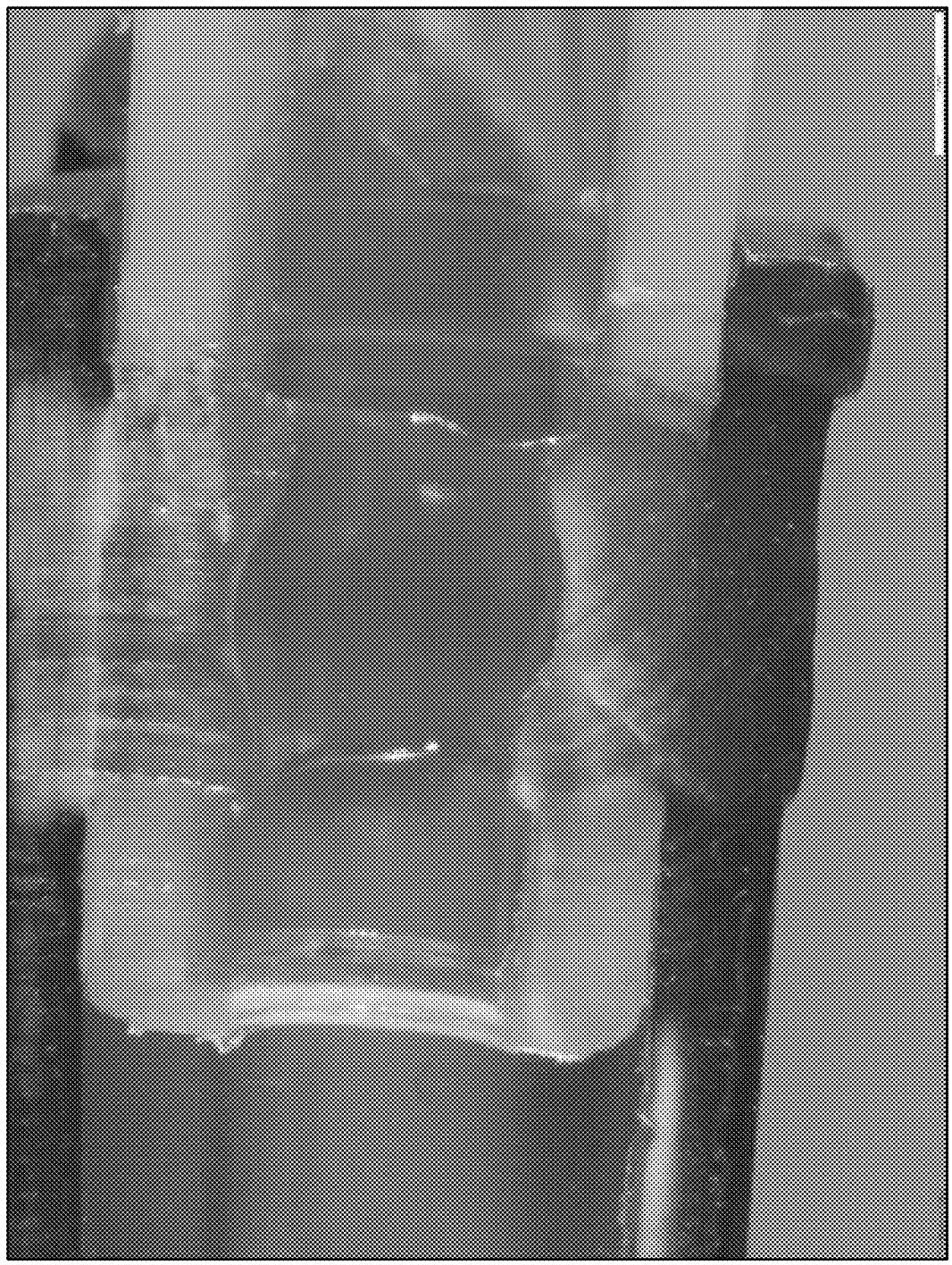
FIG. 3 is an example photograph of a laser weld achieved using the optical reflector according to the present disclosure.
Figure 4:
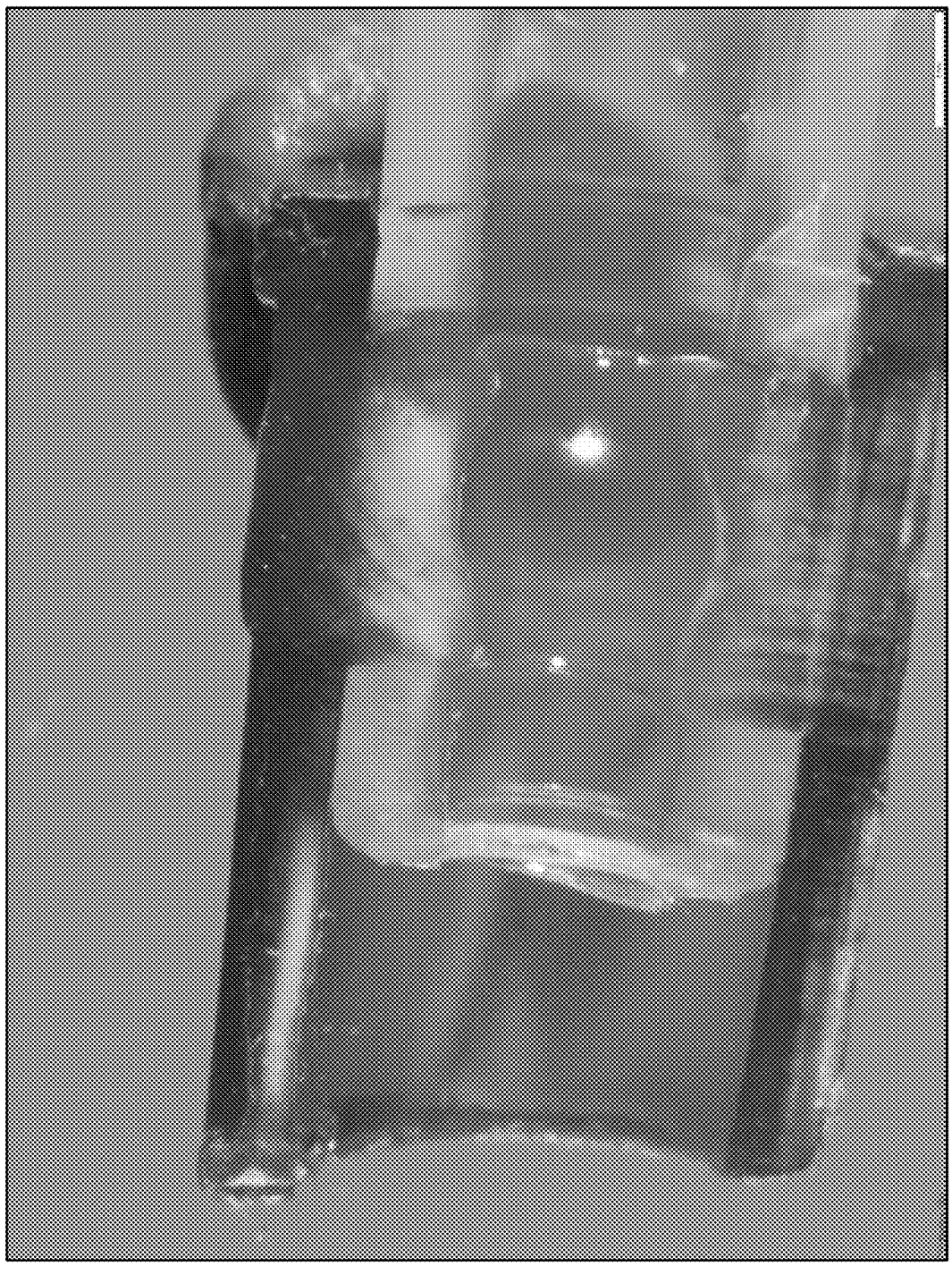
FIG. 4 is a further example photograph of a laser weld achieved using the optical reflector according to the present disclosure.

FIGS. 3-4 illustrate photographs of cross-sections of thermoplastic sample workpieces joined by the welding apparatus and method disclosed herein, showing the high quality and consistently uniform weld circumferentially around the joined interfaces. The reflecting surfaces 262a, 262b were angled at an angle α of 133 degrees.

Figure 6A:
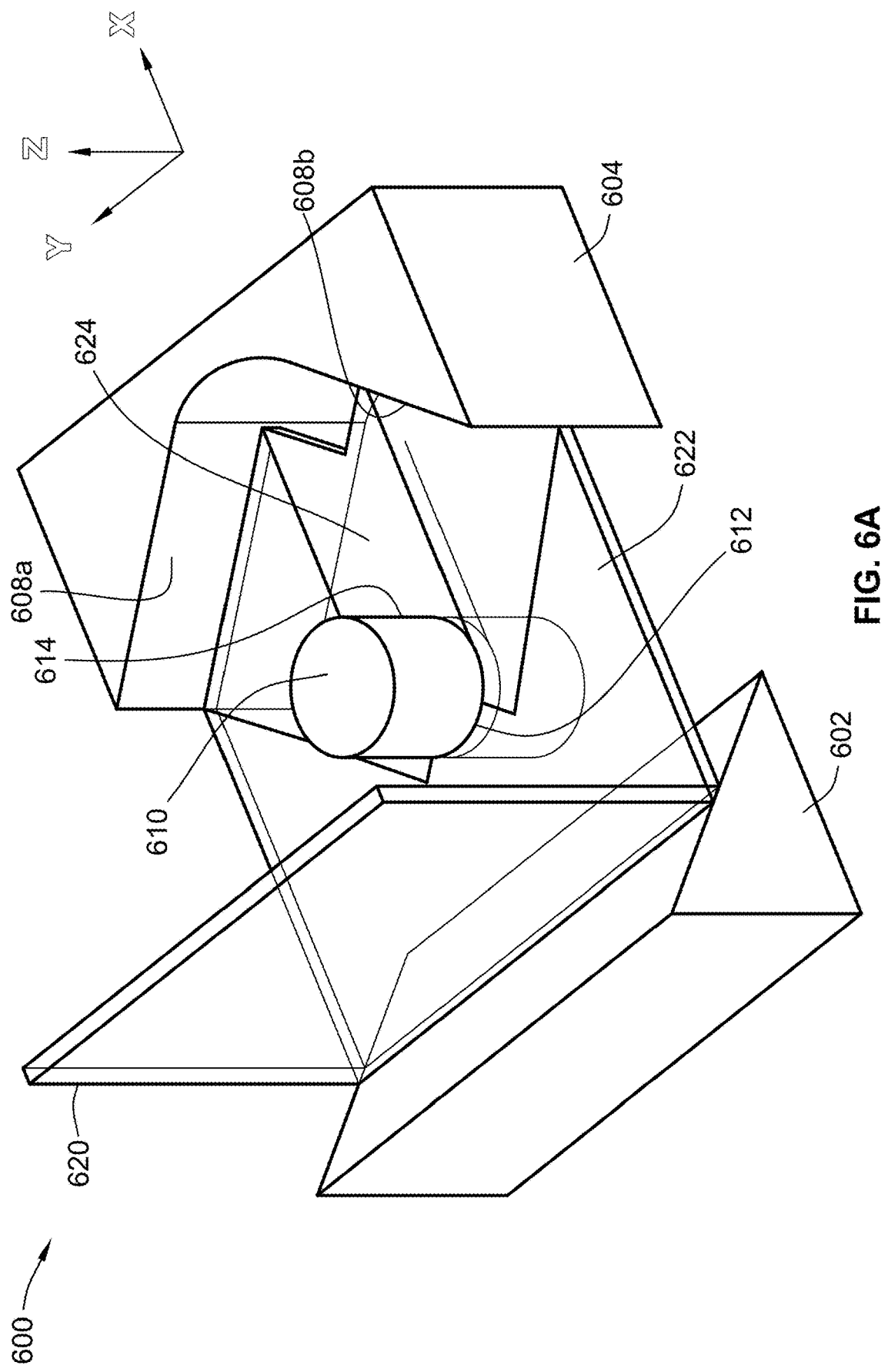
FIG. 6A is a perspective view of an example laser assembly and workpiece assembly with an optical reflector arranged to irradiate a workpiece along directions orthogonal to the laser beam direction, including areas behind the direct path of the laser.

FIG. 6A illustrates another example workpiece assembly 600 with a fixed laser source omitted for ease of illustration. This assembly 600 uses an extra conversion: a fixed laser source (not shown) is above shining vertically down (along the Z-axis direction 620), then the beam is reflected horizontally (X-Y plane or X-direction) on a cylindrical part or workpiece 610. The front 612 of the workpiece part 610 is exposed to the laser beam 622 directly and the back 614 of the workpiece 610 is illuminated due to reflection from mirrors 608a,b. Put another way, the fixed laser source directs a laser beam 620 in a vertical (Z-axis) direction toward a first angled reflector 602, which in this example, changes the direction of the laser beam by 90 degrees so that it runs in a direction orthogonal to the original direction of the laser beam 620 (along the X-axis or X-Y plane).

The main advantage of the extra conversion is the ability to redirect the laser beam to be perpendicular to the weld while the laser source remains (preferably in a fixed position) above the workpiece 610. This gives the ability to reach an otherwise inaccessible weld surface when the workpiece 610 is constrained to a vertical orientation.

In the illustrated assembly 600, the mirror design is a basic example having a first mirror 602 angled at 45 degrees to project the beam onto the next mirrors 608a,b (and optionally additional mirrors, not shown), which is also angled at 45 degrees to reach the back side 614 of the workpiece 610, which in this example has a generally cylindrical shape. Those skilled in the art will appreciate that the mirror angles do not necessarily have to be constrained to 45 degrees; rather the angles can be tailored specifically to the needs to the application to deliver the beam precisely to an otherwise inaccessible weld surface, without requiring turning, moving, or rotation of the workpiece 610. The workpiece 610 can remain fixed relative to the workpiece assembly 600, and the laser source can also remain fixed. There can also be additional mirrors besides 608a, 608b to gain the ability to reach the weld area to accommodate space or clearance constraints.

Figure 6B:
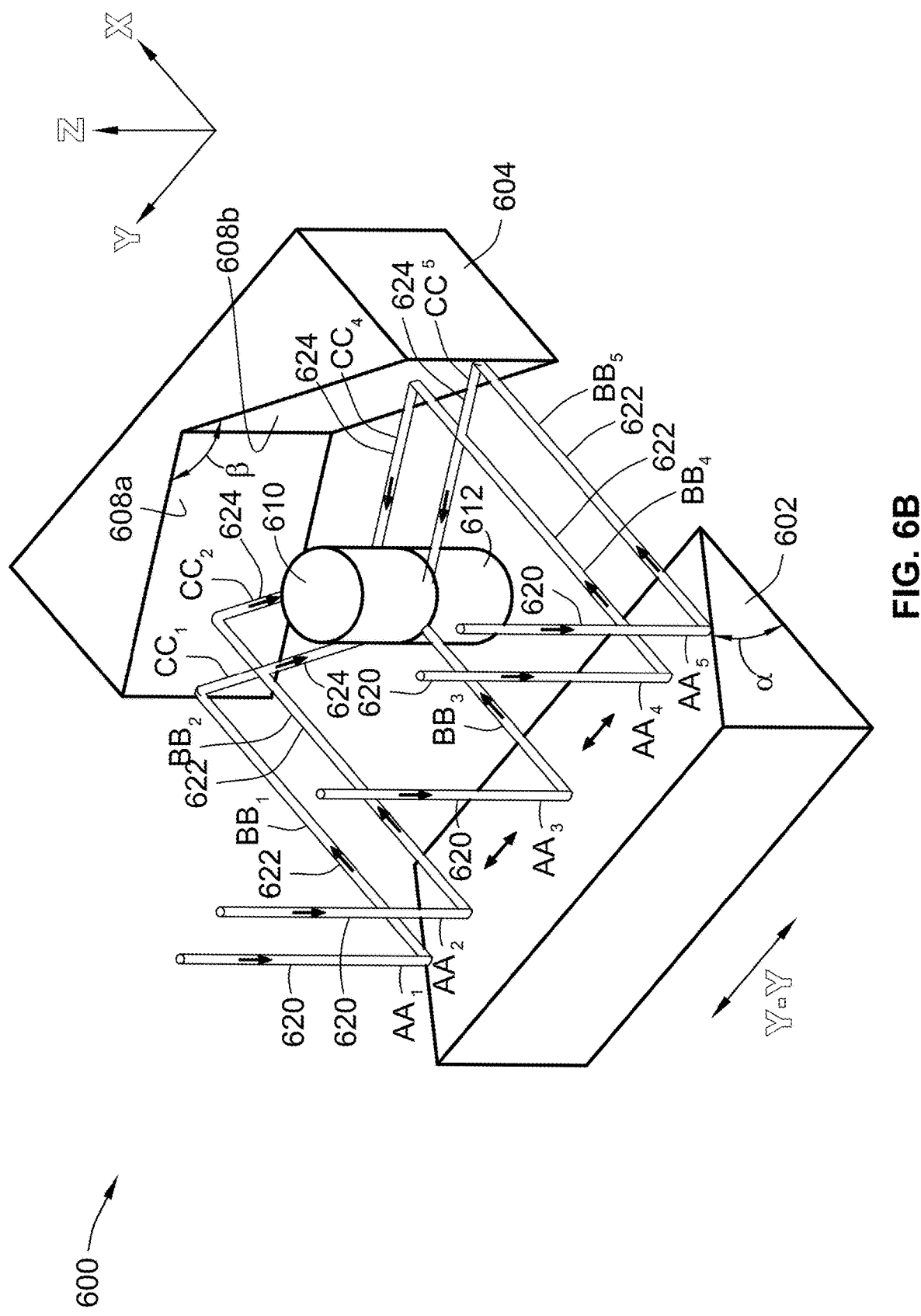
FIG. 6B is a perspective view of an example laser assembly with labels to show example travel paths of the laser as it traverses the first optical reflector and then two angled reflectors to create a circumferential weld around a workpiece.

In the example assembly 600 shown in FIG. 6B, a cylindrical work piece 610, 612 is constrained to a vertical orientation (Z-axis) while the weld joint is orientated perpendicularly (X-Y plane) around its circumference. The laser source (not shown) is positioned above the workpiece 610 and emits a downward (Z-axis) vertical laser beam 620 to a conversion plane reflector 602 to change the direction of the laser beam from vertical (Z-axis) to horizontal (X-axis). In the example shown, the conversion plane reflector 602 is at 45 degrees (angle α shown in FIG. 6B) relative to the incoming laser beam 620, but those skilled in the art will appreciate that this angle can be any acute angle (e.g., any acute angle between 15-75 degrees) tailored to the specific needs of the workpiece 610, 612.

The reflected horizontal beam 622, which is emanates from the conversion plane reflector 602, travels onward (X-Y plane) to illuminate the next reflector 608a, 608b, respectively, and the front side of the work piece 610 as the weld path travels along the conversion plane reflector 602 (along direction Y-Y).

The second reflector 608a,b, has two fixed reflecting surfaces that illuminate the backside of the workpiece 610 by reflecting the previous incident beam 624. The angle between the secondary reflectors 608a,b in the example shown is 120 degrees (angle β shown in FIG. 6B), or 60 degrees on each side of normal (taken along X-axis). It is important to emphasize that angle β can be specifically tailored to the needs of the application and shape/size of the workpiece 610. Any obtuse angle β greater than 90 degrees and less than 180 degrees is contemplated.

The distance between the conversion plane reflector 602 and the second reflector 608a,b (e.g., length BB5) can also be specifically tailored for the needs of each application based on the size/shape of the workpiece 610 and the focal distance of the laser optics.

It is also important to understand that the weld path generated onto the conversion plane reflector 602 is continuous from left to right (direction Y-Y) or vice versa. It is also contemplated to use more than a single pass of the laser path depending on the heating needs of the workpiece 610. Furthermore, this weld path can be broken down into multiple segments to create the continuous path and individual parameters can be assigned to each segment independently based on the needs of the application.

The main advantage of the conversion plane reflector 602 is its ability to change the direction of the laser beam from vertical (Z-axis) to horizontal (X-axis) while the laser source (not shown) remains above the workpiece 610 to accommodate such workpieces that are constrained to this orientation. When the conversion plane reflector 602 is applied with a secondary reflector, such as reflectors 608a,b, the main advantage is the ability to weld a workpiece 360 degrees (or circumferentially) while changing the beam orientation. These beam profiles can be calculated empirically to optimize each angle of the reflectors as necessary per application. Put another way, the laser beam changes direction at least twice to illuminate a workpiece circumferentially. One change of beam direction is sufficient to illuminate a front portion of the workpiece, while two changes of beam directions are sufficient to illuminate a rear portion of the workpiece. The labels AA1-AA5 illustrate example laser beam paths emanating from the laser source and traveling along the Z-axis toward the conversion plane reflector 602. After hitting the reflector 602, the beam direction changes by 90 degrees from the Z-axis to the X-axis and travels along example laser beam paths BB1-BB5. Some of these beam paths, such as BB3, illuminate a front portion of the workpiece 610. The other beam paths BB1, BB2, BB4, BB5, pass around the workpiece 610 to hit the secondary reflectors 608a,b, which cause the beam to change directions again according to the angle of the secondary reflectors 608a,b. Some of these beam paths will then travel along paths CC1, CC2, CC4, and CC5 as shown in FIG. 6B, thereby illuminating the back portion of the workpiece 610.

This concept would also work for workpiece parts having a shape other than cylindrical. Odd-shaped parts can also be welded as long as the sides are similar in length and space allows for the mirror design. Likewise, the angle of the first angled reflector 602, which is shown as 45 degrees, can also be modified to direct the laser energy in a direction to directly reach a weld surface of the workpiece part 610. The angle of the first angled reflector 602 will determine where the laser energy directly reaches the front part 612 of the workpiece 610, whereas the mirrors 608a, 608b and their respective angles will determine where the laser energy reaches the inaccessible areas 614 (i.e., inaccessible to direct irradiation by the laser beam) of the workpiece 610. Odd-shaped workpieces are particularly well-suited for this application, and any workpiece where the weld needs to be reach all or substantially all of a circumferential area of a part.

Although the inventions and other aspects will be described in connection with certain preferred embodiments or examples, it will be understood that the present disclosure is not limited to those particular embodiments or examples. On the contrary, the present disclosure is intended to cover all alternatives, modifications, and equivalent arrangements as may be included within the spirit and scope of the invention as defined by the appended claims.

What is claimed is:
1. A laser welding system for welding around all or most of a circumference of a workpiece, the system comprising:
a laser beam source configured to direct a laser beam; and
an assembly including a first angled reflector and an optical reflector assembly, the first angled reflector being arranged at a fixed angle to change a direction of the laser beam so that the laser beam irradiates a front area of the workpiece, the optical reflector assembly having at least two angled mirrors positioned to direct the laser beam passing around the workpiece to reach areas of the workpiece that are not directly in the path of the laser beam,
wherein the optical reflector assembly includes a third mirror positioned to change a direction of at least a portion of the laser beam toward an area of the work- piece that is not directly in the path of the laser beam after being reflected by the first angled reflector.

2. The system of claim 1, wherein the first angled reflector is angled relative to the laser beam at 45 degrees such that the laser beam changes direction orthogonally relative to its direction emanating from the laser beam source.

3. The system of claim 1, wherein the at least two angled mirrors include a first mirror and a second mirror, the first mirror and the second mirror being arranged on a curved surface of the optical reflector assembly such that they change a direction of the laser beam by 45 degrees, thereby allowing the laser beam to reach the areas of the workpiece that are not directly in the path of the laser beam.

4. The system of claim 1, wherein the laser beam source is fixed, and wherein the workpiece is fixed relative to the assembly as the laser beam is presented to the workpiece.

5. The system of claim 1, wherein the workpiece has a generally cylindrical cross section at an area where a weld is to be created, the laser beam reaching an entire circumference of the workpiece in response to its direction being changed by the first angled reflector and the optical reflector assembly.

6. The system of claim 1, wherein the laser beam changes directions at least twice according to a first direction and a second direction, wherein a beam path along the first direction illuminates the front area of the workpiece and a beam path along the second direction illuminates the back area of the workpiece.

7. The system of claim 1, wherein an angle between the at least two angled mirrors is an obtuse angle between 90 degrees and 180 degrees.

8. A laser welding method for welding around at least a substantial portion of a circumference of a workpiece, the method comprising the steps of:
positioning and fixing a workpiece relative to an assembly; and
directing a laser beam toward the assembly in a first direction, the assembly including a first angled reflector and an optical reflector assembly, the first angled reflector being arranged at an angle to change the first direction of the laser beam so that the laser beam irradiates a front area of the workpiece, the optical reflector assembly having at least two angled mirrors positioned to direct the laser beam passing around the workpiece to reach areas of the workpiece that are not directly in the path of the laser beam,
wherein the optical reflector assembly includes a third mirror positioned to change a direction of at least a portion of the laser beam toward an area of the workpiece that is not directly in the path of the laser beam after being reflected by the first angled reflector.

9. A laser welding system for welding around all or most of a circumference of a workpiece, the system comprising:
a laser beam source configured to direct a laser beam; and
an assembly including a first angled reflector and an optical reflector assembly, the first angled reflector being arranged at a fixed angle to change a direction of the laser beam so that the laser beam irradiates and welds a front area of the workpiece, the optical reflector assembly having at least two angled mirrors positioned to direct the laser beam passing around the workpiece to reach and weld areas of the workpiece that are not directly in the path of the laser beam.

10. The system of claim 9, wherein the first angled reflector is angled relative to the laser beam at 45 degrees such that the laser beam changes direction orthogonally relative to its direction emanating from the laser beam source.

11. The system of claim 9, wherein the at least two angled mirrors include a first mirror and a second mirror, the first mirror and the second mirror being arranged on a curved surface of the optical reflector assembly such that they change a direction of the laser beam by 45 degrees, thereby allowing the laser beam to reach the areas of the workpiece that are not directly in the path of the laser beam.

12. The system of claim 9, wherein the laser beam source is fixed, and wherein the workpiece is fixed relative to the assembly as the laser beam is presented to the workpiece.

13. The system of claim 9, wherein the workpiece has a generally cylindrical cross section at an area where a weld is to be created, the laser beam reaching an entire circumference of the workpiece in response to its direction being changed by the first angled reflector and the optical reflector assembly.

14. The system of claim 9, wherein the optical reflector assembly includes a third mirror positioned to change a direction of at least a portion of the laser beam toward an area of the workpiece that is not directly in the path of the laser beam after being reflected by the first angled reflector.

15. The system of claim 9, wherein the laser beam changes directions at least twice according to a first direction and a second direction, wherein a beam path along the first direction illuminates the front area of the workpiece and a beam path along the second direction illuminates the back area of the workpiece.

16. The system of claim 9, wherein an angle between the at least two angled mirrors is an obtuse angle between 90 degrees and 180 degrees.

* * * * *